H. PAULING.
PROCESS FOR HIGH CONCENTRATION OF WATERY NITRIC ACID.
APPLICATION FILED AUG. 29, 1913.
1,074,287.
Patented Sept. 30, 1913.
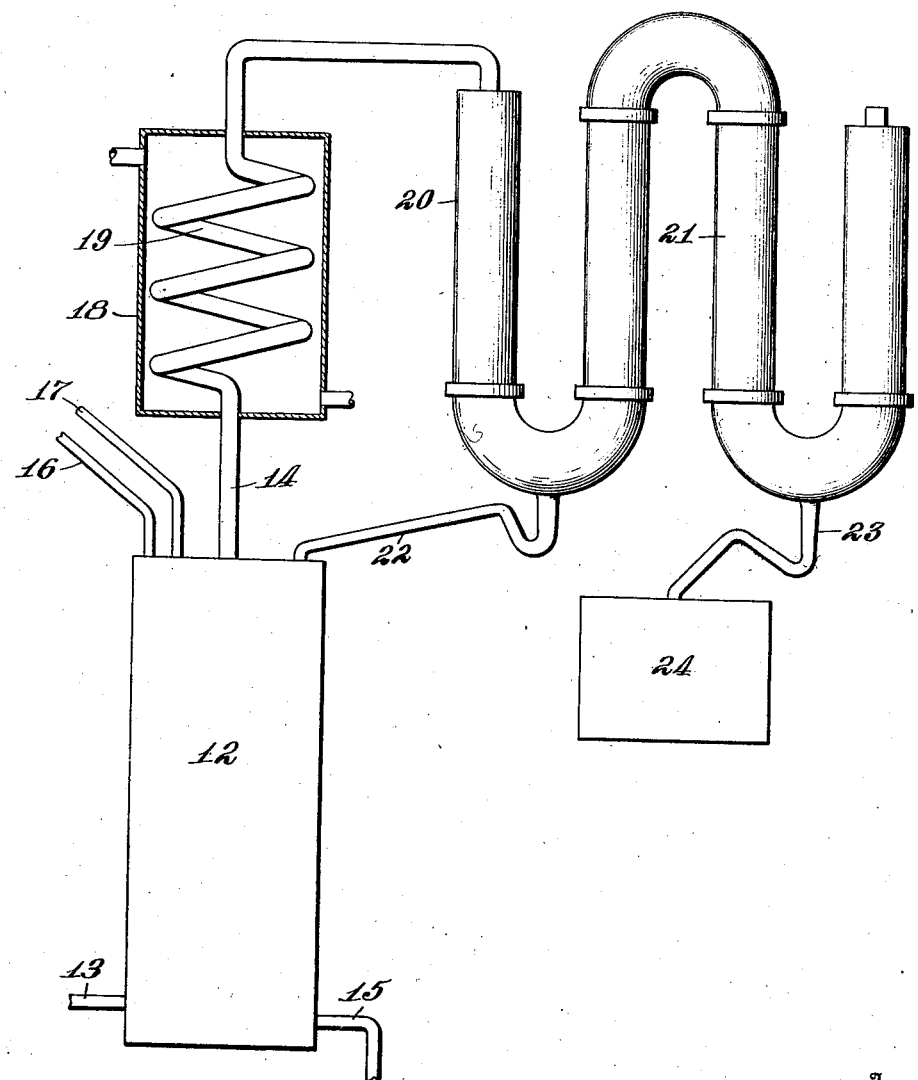

UNITED STATES PATENT OFFICE.

HARRY PAULING, OF COLOGNE, GERMANY, ASSIGNOR TO SOUTHERN ELECTRO-CHEMICAL COMPANY, OF NEW YORK, N. Y., A CORPORATION OF NEW JERSEY.

PROCESS FOR HIGH CONCENTRATION OF WATERY NITRIC ACID.

1,074,287.   Specification of Letters Patent.   Patented Sept. 30, 1913.

Application filed August 29, 1913. Serial No. 787,260.

*To all whom it may concern:*

Be it known that I, HARRY PAULING, a subject of the Emperor of Germany, residing at Cologne, Empire of Germany, have invented new and useful Improvements in Processes for High Concentration of Watery Nitric Acid, of which the following is a specification.

My present invention relates to an improved process for the manufacture of highly concentrated nitric acid from watery nitric acid by means of sulfuric acid or other suitable dehydrating agent, and is in the nature of an improvement upon, or addition to, the process set forth in my prior U. S. Patent #1,031,864, dated July 9, 1912. According to the process set forth in said prior patent and the preliminary steps of which are also carried on according to the present process, aqueous nitric acid together with sulfuric acid or some other suitable dehydrating agent, is caused to pass against or through a countercurrent of hot gaseous medium composed largely of steam, or a large proportion of steam and gases inert toward nitric acid, the conditions of operation being such that highly concentrated vapors of nitric acid are obtained, while the water originally present in the aqueous nitric acid is substantially all taken up and retained by the dehydrating agent.

The object of the present invention is to bring about or obtain a more highly concentrated nitric acid, in one operation or by a continuous process, with the aid of a strong dehydrating agent, such for instance as sulfuric acid, but without being compelled to use a grade of sulfuric acid stronger than about 80%, as against a 94% grade as is contemplated by the process of my aforesaid patent. By employing sulfuric acid of no higher than the 80% grade, I am able to overcome the well known difficulties arising from the use of a higher grade,—namely, the reconcentration of the diluted sulfuric acid to its original state. This re-concentration of the used sulfuric acid up to 80% does not present any technical or practical difficulties, but if a higher than an 80% grade is employed, not only are technical difficulties encountered, but the cost of reconcentration of the sulfuric acid is such that its use as a dehydrating agent in the concentration of nitric acid becomes unprofitable.

Up to the present time and prior to my present discovery, so far as I am aware, in order to produce nitric acid of say a 30% grade, by means of electrical burning of air through absorption of nitrogen gases and to obtain a high concentration thereof, it has been necessary to use sulfuric acid of over 90% irrespective of the refining process employed, and as before pointed out the use of 90% sulfuric acid is unprofitable and otherwise objectionable.

I have discovered that by employing the process set forth in my aforesaid Patent #1,031,864, dated July 9, 1912, wherein I provide for passing sulfuric acid and diluted nitric acid against a countercurrent of hot gaseous medium composed largely of steam, and adding to the said mixture a part of the high percentage nitric acid so produced, I can with an 80% grade of sulfuric acid obtain nitric acid of any desired high concentration and by a continuous process. The added part or quantity of the finished product (nitric acid) will, of course, be measured according to the finally desired concentration. As will be understood, according to this fraction or stage condensation of the high percentage nitric acid vapors, the weaker acids are first separated which correspond to the average composition of the vapors, and a part in the form of high percentage vapors escapes and is collected in the second fraction or stage, and accordingly the following fractions are obtained. For example, a vapor which would correspond in its composition to a 90% nitric acid would yield at first an 88% and then a 96% fraction. The quantity and proportions would of course depend entirely upon the temperature and cooling of the parts. If the first fraction or condensation stage is led back partly or wholly into the concentration apparatus a great advantage is gained, as will be apparent, and the second and following fractions present at once the finished highly concentrated product.

By referring to the accompanying drawing, which is a conventional illustration of one form of apparatus for carrying out the process, the invention will be more clearly understood.

In the said drawing the reference numeral 12, designates a suitable distilling column, which, as understood, is partly filled with a suitable " filling " mass. A pipe 13, for dry steam or other hot gaseous medium enters the lower part of the column and the mixed vapors pass out at the top of the column through the pipe 14. Preferably the steam is superheated, but this is not essential and instead of pure steam, inert gases mixed with a large proportion of steam may be used. Obviously "countercurrent" apparatus other than a vertical column may be employed. The rate at which the hot gaseous medium is supplied to the base of the column should, of course, be so regulated that highly concentrated nitric acid vapors leave the outlet pipe 14, at the top of the column while the spent sulfuric acid leaving the base of the column through pipe 15 retains substantially all the water originally present in the dilute nitric acid which passes in at the top of the column through the pipe 16. Also sulfuric acid enters the top of the column through the pipe 17. Now as the dilute nitric acid together with the sulfuric acid pass in at the top of the column 12, through the pipes 16 and 17, respectively, they are met by the countercurrent of steam or steam and gas and the nitric acid is almost wholly separated from the mixture; the steam is gradually absorbed by the sulfuric acid, and converted into water, whereby its latent heat is liberated and utilized for evaporation of the nitric acid. This action takes place along the whole common path of the streams, and by using a path of sufficient length nitric acid of high concentration is obtained and practically all traces of nitric acid are removed from the sulphuric acid. The nitric acid vapors passing out of the column 12, through the pipe 14, enter a cooling coil 19, arranged in a tank 18, through which a cooling medium is passed, and from the said coil the vapors pass successively into a plurality of condensing columns or chambers 20, 21, of any suitable construction and of which only two are shown, but more may be provided if desired. A part or all of the condensed nitric acid collected in the first condensing chamber 20, is passed back, by means of a pipe 22, into the column 12, and enters the latter along with the beforementioned watery nitric acid and sulfuric acid mixture where it meets with the countercurrent of steam or hot gases. The quantity of nitric acid passing from the first condensing chamber 20, back into the column 12, may be regulated by any suitable means depending upon the desired strength of the final product. This final product which is very highly concentrated nitric acid, collects in one of the condensing chambers as 21, coming after the first chamber 20, and may be drawn off through a pipe 23, and collected in a vessel 24. If desired a part, or all, of the condensation of the second chamber 21, may be passed back into the column 12, and treated in the same way as the nitric acid passing from the first condensing chamber, in which event however I would probably employ more than two condensing chambers and draw the final highly concentrated product from the last chamber or from several of the chambers.

By operating in the manner herein described I am able to carry on the process continuously and economically and obtain a highly concentrated product at relatively low cost of production.

What I claim is:—

1. The process herein described of concentrating aqueous nitric acid, which consists in passing watery nitric acid together with a dehydrating agent against a countercurrent of hot gaseous medium, collecting and condensing the highly concentrated nitric acid vapors given off and returning all or a portion of such condensate for further treatment by said countercurrent and dehydrating agent.

2. The process herein described of concentrating aqueous nitric acid, which comprises passing aqueous nitric acid together with a dehydrating agent through a distilling column, introducing superheated steam at one end of the column, withdrawing vapors of highly concentrated nitric acid from the opposite end of the column, condensing said vapors, and leading some of the acid so condensed back into the column for reconcentration.

3. The process herein described of concentrating aqueous nitric acid, which comprises passing aqueous nitric acid together with a dehydrating agent through a distilling column, introducing superheated steam at one end of the column, withdrawing vapors of highly concentrated nitric acid from the opposite end of the column, condensing said vapors in successive stages, and leading some of the acid so condensed back into the column for reconcentration.

4. The process herein described of concentrating aqueous nitric acid, which comprises passing a mixture of aqueous nitric acid and sulfuric acid against a countercurrent of steam, collecting and condensing the highly concentrated nitric acid vapors, and repassing some of the nitric acid so condensed back through the said countercurrent along with the original mixture of nitric acid and sulfuric acid.

5. The process herein described of concentrating nitric acid, which consists in passing a relatively weak mixture of aqueous nitric acid and sulfuric acid through a countercurrent of superheated steam, collecting and condensing the highly concentrated nitric acid vapors in successive stages, and returning a portion of the aqueous nitric acid so condensed in the first stage for further concentration.

In testimony whereof I have hereunto set my hand in presence of two subscribing witnesses.

HARRY PAULING.

Witnesses:
  MORITZ WETZEL,
  MINNA RITZEL.